(12) United States Patent
Chimner et al.

(10) Patent No.: US 8,701,390 B2
(45) Date of Patent: Apr. 22, 2014

(54) ADAPTIVE CONTROL STRATEGY

(75) Inventors: Christian Thomas Chimner, Royal Oaks, MI (US); Hanlong Yang, Novi, MI (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 820 days.

(21) Appl. No.: 12/953,325

(22) Filed: Nov. 23, 2010

(65) Prior Publication Data

US 2012/0124967 A1    May 24, 2012

(51) Int. Cl.
*F01N 3/00*    (2006.01)

(52) U.S. Cl.
USPC ............ 60/295; 60/274; 60/301; 60/285; 60/286

(58) Field of Classification Search
USPC ............ 60/274, 285, 286, 295, 301
See application file for complete search history.

(56) References Cited

U.S. PATENT DOCUMENTS

| | | | |
|---|---|---|---|
| 5,771,686 A * | 6/1998 | Pischinger et al. | 60/274 |
| 6,408,615 B1 * | 6/2002 | Hahn | 60/274 |
| 6,460,329 B2 | 10/2002 | Shimotani et al. | |
| 6,499,291 B2 * | 12/2002 | Lang et al. | 60/277 |
| 6,615,579 B2 * | 9/2003 | Nishiyama | 60/285 |
| 6,843,051 B1 * | 1/2005 | Surnilla et al. | 60/274 |
| 7,251,930 B2 * | 8/2007 | Audouin | 60/285 |
| 2001/0002539 A1 * | 6/2001 | Zhang | 60/286 |
| 2002/0026790 A1 * | 3/2002 | Shimotani et al. | 60/285 |
| 2002/0128146 A1 * | 9/2002 | Druckhammer et al. | 502/20 |
| 2003/0056500 A1 * | 3/2003 | Huynh et al. | 60/295 |
| 2008/0184701 A1 * | 8/2008 | Katoh et al. | 60/299 |
| 2008/0314025 A1 * | 12/2008 | Toshioka et al. | 60/285 |
| 2008/0314031 A1 * | 12/2008 | Shamis et al. | 60/295 |
| 2009/0084089 A1 * | 4/2009 | Arlt et al. | 60/295 |

FOREIGN PATENT DOCUMENTS

| | | | | |
|---|---|---|---|---|
| DE | 19607151 | * | 7/1997 | |
| DE | 10305635 A1 * | | 8/2004 | F01N 9/00 |
| EP | 1118756 A2 * | | 7/2001 | F02D 41/02 |
| EP | 1460246 A2 * | | 9/2004 | F01N 11/00 |
| JP | 2001003736 A | * | 1/2001 | F01N 3/20 |

* cited by examiner

*Primary Examiner* — Thomas Denion
*Assistant Examiner* — Patrick Maines
(74) *Attorney, Agent, or Firm* — Paul V. Keller

(57) ABSTRACT

A vehicle has an exhaust aftertreatment system including an LNT. The vehicle operates through a series of ignition cycles, $deNO_X$ cycles, and $deSO_X$ cycles. $DeNO_X$ operations begin when the LNT reaches a loading threshold. The applicable threshold depends on operating conditions, such as mean LNT temperature and mean exhaust flow rate. The thresholds are adapted based on $NO_X$ removal efficiency data. The data is compared to target values. The target values depend on the operating condition range, but remain fixed while the thresholds are adapted. $NO_X$ removal efficiency is measured over intervals corresponding to entire $deNO_X$ cycles. The data is sorted into bins according to operating conditions. The adaptations are only made if a bin has several data points accumulated over a minimum interval that is at least one ignition or $deSO_X$ cycle, preferably several. The method provides stable adaptations that compensate for aging.

23 Claims, 3 Drawing Sheets

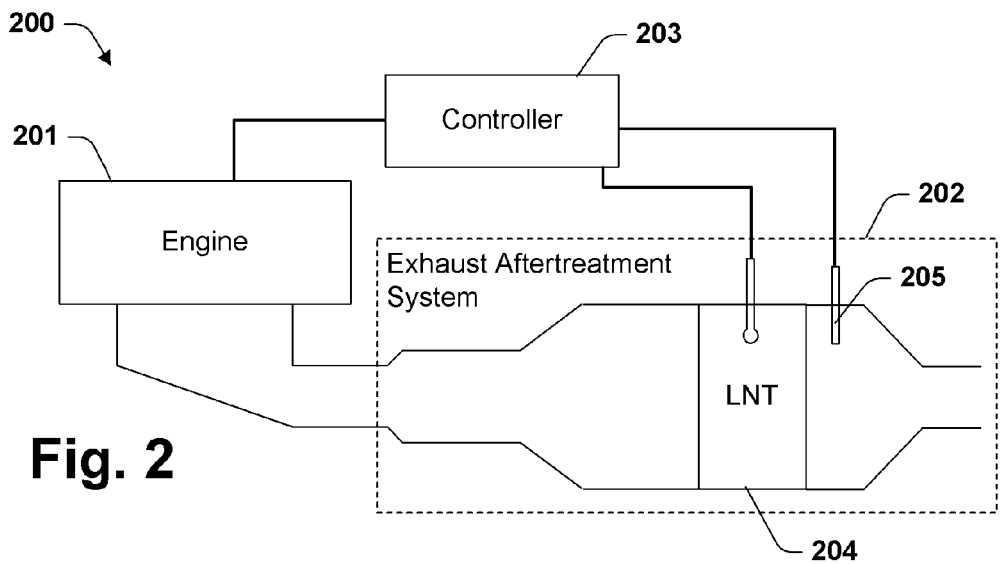
Fig. 2
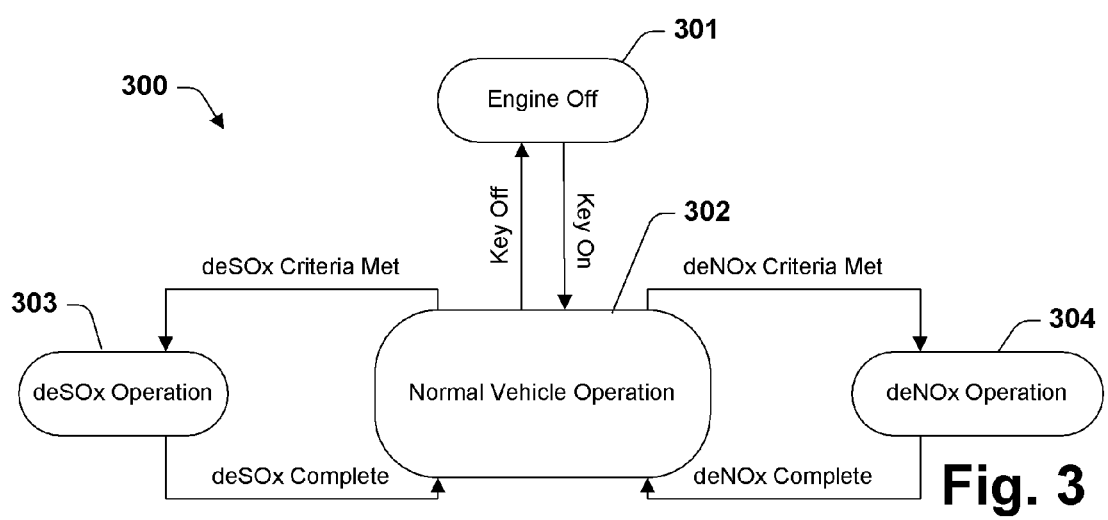
Fig. 3
| Region | 1 | 2 | 3 | ... | 11 | ... | n |
|---|---|---|---|---|---|---|---|
| Slot 1 | 0 | # | # |  | # |  | 0 |
| Slot 2 | 0 | # | # |  | # |  | 0 |
| Slot 3 | 0 | # | 0 |  | # |  | 0 |
| Slot 4 | 0 | 0 | 0 |  | # |  | 0 |
| Slot 5 | 0 | 0 | 0 |  | 91.2% |  | 0 |
Fig. 4

US 8,701,390 B2

ADAPTIVE CONTROL STRATEGY

FIELD OF THE INVENTION

The invention relates to systems having diesel-fueled internal combustion engines with exhaust aftertreatment and methods of operating those systems.

BACKGROUND

Diesel-fueled internal combustion engines are used to power vehicles such as medium and heavy duty trucks. Diesel engines are also used in stationary power generation systems. While exhaust aftertreatment systems for gasoline engine have been widely used since the 1970s, diesel engine aftertreatment systems have only recently come into widespread use.

Whereas gasoline engines use spark ignition, diesel engines use compression ignition. As a consequence, the composition of diesel exhaust is much different from that of gasoline engines. The major pollutants in gasoline engine exhaust are carbon monoxide, unburned hydrocarbons, and some $NO_X$. The major pollutants in diesel engine exhaust are $NO_X$ and particulate matter (soot).

A catalytic converter, which is an exhaust aftertreatment device comprising a so-called three-way catalyst, can effectively control gasoline engine emissions by oxidizing carbon monoxide and unburned hydrocarbons while also reducing $NO_X$. This approach is unsuitable for diesel engine exhaust because diesel exhaust contains from about 4 to 20% oxygen. The excess oxygen and dearth of oxygen accepting species (reductants) makes catalytic converters ineffective for reducing $NO_X$ in diesel exhaust.

Several solutions have been proposed for controlling $NO_X$ emissions from diesel-powered vehicles. One set of approaches focuses on the engine. Techniques such as exhaust gas recirculation and partially homogenizing fuel-air mixtures are helpful, but these techniques alone will not eliminate $NO_X$ emissions. Another set of approaches remove $NO_X$ from the vehicle exhaust. These include the use of lean-burn $NO_X$ catalysts, selective catalytic reduction (SCR) catalysts, and lean $NO_X$ traps (LNTs).

Lean-burn $NO_X$ catalysts promote the reduction of $NO_X$ under oxygen-rich conditions. Reduction of $NO_X$ in an oxidizing atmosphere is difficult. It has proven challenging to find a lean-burn $NO_X$ catalyst that has the required activity, durability, and operating temperature range. A reductant such as diesel fuel must be steadily supplied to the exhaust for lean $NO_X$ reduction, adding 3% or more to the engine's fuel requirement. Currently, the sustainable $NO_X$ conversion efficiencies provided by lean-burn $NO_X$ catalysts are unacceptably low.

SCR generally refers to selective catalytic reduction of $NO_X$ by ammonia. The reaction takes place even in an oxidizing environment. The $NH_3$ can be temporarily stored in an adsorbent or ammonia can be fed continuously into the exhaust. SCR can achieve high levels of $NO_X$ reduction, but there is a disadvantage in the lack of infrastructure for distributing ammonia or a suitable precursor. Another concern relates to the possible release of ammonia into the environment.

LNTs are devices that adsorb $NO_X$ under lean conditions and reduce and release the adsorbed $NO_X$ under rich conditions. An LNT generally includes a $NO_X$ adsorbent and a catalyst. The adsorbent is typically an alkali or alkaline earth compound, such as $BaCO_3$ and the catalyst is typically a combination of precious metals including Pt and Rh. In lean exhaust (exhaust containing an excess of oxygen and other oxidizing species in comparison to reducing compounds), the catalyst speeds reactions that lead to $NO_X$ adsorption. In a rich exhaust (containing reductants in excess of oxidizing compounds), the catalyst speeds reactions by which reductants are consumed and adsorbed $NO_X$ is reduced and desorbed. In a typical operating protocol, $deNO_X$ operations, which include producing a rich environment within the exhaust, are carried out from time-to-time to regenerate (denitrate) the LNT.

In addition to accumulating $NO_X$, LNTs accumulate $SO_X$. $SO_X$ is the product of combusting sulfur-containing fuels. Even with low sulfur diesel fuels, the amount of $SO_X$ produced by combustion is significant. $SO_X$ adsorbs more strongly than $NO_X$ and necessitates a more stringent, though less frequent, regeneration (desulfation or $deSO_X$ operation). A $deSO_X$ operation requires more time than a $deNO_X$ operation. Desulfation requires elevated temperatures, e.g., 700° C. Accordingly, a $deSO_X$ operation generally comprises a heating phase followed by a rich phase in which the $SO_X$ is actually removed. Ideally, rich conditions are maintained continuously until the $deSO_X$ operation is complete, but it may be necessary to periodically interrupt the rich phase to avoid overheating. Whereas a $deNO_X$ operation can be completed in a few seconds, $deSO_X$ operations take several minutes, commonly on the order of 5-15 minutes.

Using an LNT to control $NO_X$ emissions from a diesel-powered vehicle causes a fuel penalty of several percent, the fuel penalty being the increase in the vehicle's fuel consumption in comparison to running the vehicle without exhaust aftertreatment. Most of the fuel penalty is the cost of carrying out $deNO_X$ operations. All other factors being equal, reducing the frequency of $deNO_X$ operations to the minimum required reduces the fuel penalty. However, the fuel penalty is dependent on the conditions prevailing during $deNO_X$ operations, particularly LNT temperature, exhaust oxygen concentration, and exhaust flow rate. Fuel can be saved by preferentially carrying out $deNO_X$ operations when conditions are more suitable. Minimizing the fuel penalty as a whole involves balancing the urgency of the need to regenerate with the suitability of present (or anticipated) conditions for carrying out a $deNO_X$ operation.

U.S. Pat. No. 6,615,579 describes an exhaust purification system in which $deNO_X$ operations are carried out when the $NO_X$ loading of an LNT reaches a threshold level. The $deNO_X$ operations comprise running the engine rich. The threshold is set higher when the engine load is high in order to reduce fuel consumption and improve engine durability.

U.S. Pat. No. 6,460,329 describes another method in which $deNO_X$ operations are carried out when an LNT reaches a threshold loading level. The threshold is adapted to account for aging. Aging is assessed from LNT performance immediately following each regeneration.

In spite of advances, there continues to be a long felt need for an affordable and reliable diesel exhaust aftertreatment system that is durable, has a manageable operating cost (including fuel requirement), and reduces $NO_X$ emissions to a satisfactory extent in the sense of meeting U.S. Environmental Protection Agency (EPA) regulations effective in 2010 and other such regulations that limit $NO_X$ emissions from trucks and other diesel-powered vehicles.

SUMMARY

The invention relates to a method of operation for a vehicle having an engine and an exhaust aftertreatment system including an LNT. The vehicle operates through a series of ignition cycles, $deNO_X$ cycles, and $deSO_X$ cycles. A controller determines the timing and manner of conduct of the deNO$_X$ and deSO$_X$ cycles according to one or more adaptable parameters. Preferred parameters to be used and adapted are threshold LNT loadings at which deNO$_X$ operations begin. Preferably there are several of these thresholds, the applicable threshold depending on operating conditions, for example, depending on the prevailing LNT temperature and exhaust flow rate.

One or more of the parameters are adapted based on NO$_X$ treatment effectiveness data. The data is obtained using measurement of NO$_X$ concentration taken in the exhaust at a position downstream from the LNT. A preferred measure of NO$_X$ treatment effectiveness is NO$_X$ removal efficiency. The effectiveness data is compared against one or more effectiveness targets and the adaptations made accordingly.

According to one aspect of the invention, a different adaptable parameter, such as an LNT loading threshold, is maintained for each distinct operating condition range. At least four distinct ranges are used, with a greater number such as sixteen being preferred. Targets are set for NO$_X$ treatment effectiveness, with the applicable target also depending on the operating condition range. The target values or ranges remain fixed while the parameters are adapted. This aspect of the invention allows the method to be adaptive while maintaining a pre-programmed preference for regenerating under certain conditions. For example, the method can adapt LNT loading thresholds to maintain effective emission control as the system ages while also preserving a variation among the thresholds that causes preferential regeneration under conditions for which the fuel penalty is comparatively low.

According to another aspect of the invention, NO$_X$ treatment effectiveness is determined for intervals corresponding to entire deNO$_X$ cycles. Each data point is determined from many measurements and characterizes NO$_X$ treatment effectiveness for a distinct interval. The data is used to adapt parameter values applicable beyond the immediate future. This aspect of the invention provides a method of adaptation that avoids reliance on instantaneous measurements. Instantaneous measurements contain more noise than interval data.

The NO$_X$ treatment effectiveness data is generally sorted into bins according to the operating conditions prevalent when the data was collected. This separates much of the effect of normal variations in operating conditions from longer term effects that parameter adaptation is intended to compensate for. This is particularly useful as a preliminary step in analyzing NO$_X$ treatment effectiveness that applies to intervals such as entire deNO$_X$ cycles.

According to another aspect of the invention, NO$_X$ treatment effectiveness data is sorted among at least four bins and accumulated between adaptations. The data is analyzed on a bin-by-bin basis, the analysis comprising comparing the data to a target value or value range applicable to data in that category. One or more parameters are adapted on the basis of the comparison. The adaptations are only made if a bin has several data points accumulated over a minimum period that is at least one ignition or deSO$_X$ cycle, preferably several. The parameters relate to the timing or conduct of future deNO$_X$ or deSO$_X$ operations. Making the adaptations only when there are several data points gathered under similar conditions and sampled over an extended period provides adaptations that compensate for aging, but are stable against more transient effects.

Adaptation to aging can be made more stable in several additional ways. One is to perform the adaptations only if the data in a bin meets a measure of internal consistency. Another is to provide a different adaptable parameter for each range of operating conditions and to selectively adapt the parameters according to the closeness of the range in which the parameter applies to the range corresponding to the data forming the basis for the adaptation. Another is to require the minimum period over which the data has accumulated to span two or more deSO$_X$ cycles or two or more ignition cycles, preferably at least five. Another is to limit the adaptations to predetermined increments. Another is to screen the data used for adaptations according to whether the immediately preceding deNO$_X$ operation was qualified as a success. Preferably, the two immediately preceding deNO$_X$ operations are required to have been successful. Another is to consider only data collected within a limited period following a successful deSO$_X$ operation. Another is to weight the data used for adaptations to give reduced weight to data collected when SO$_X$ loading of the LNT is higher. Another is to override the adaptation based on events such as component failure or component replacement.

Various methods for qualifying successfulness of deNO$_X$ operations are provided. The most preferred method is to examine whether the deNO$_X$ operation provided an expected improvement in NO$_X$ removal efficiency. Another method determines whether the amount of NO$_X$ slip during the regeneration was excessive. Another evaluates LNT O$_2$ storage following the rich phase or the fuel-air ratio in the exhaust downstream from the LNT during the rich phase to determine whether enough reductant was provided. Another method applies to the case in which a deNO$_X$ operation comprises heating a fuel reformer to steam reforming temperatures and then regenerating the LNT using syn gas produced by combustion and steam reforming reactions. The method evaluates the reformer temperature over the heating phase, the rich phase, or both to determine whether the operation executed normally. Preferably, at least two of the foregoing methods are employed to qualify the success of deNO$_X$ operations.

The primary purpose of this summary has been to present the invention in a simplified form to facilitate understanding of the more detailed description that follows. The invention contains several aspects that can be considered inventions separately or in combination. This summary is not a comprehensive description of every one of the inventors' concepts or every combination of the inventors' concepts that can be considered "invention". Other concepts may be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

BRIEF DESCRIPTION OF THE DRAWINGS

FIG. 2 is a schematic illustration of a generic system of the invention.

FIG. 3 is a finite state machine diagram that illustrates the operating modes of the system of FIG. 2.

FIG. 4 illustrates a data structure useful for implementing the invention.

DETAILED DESCRIPTION

Figure 1:
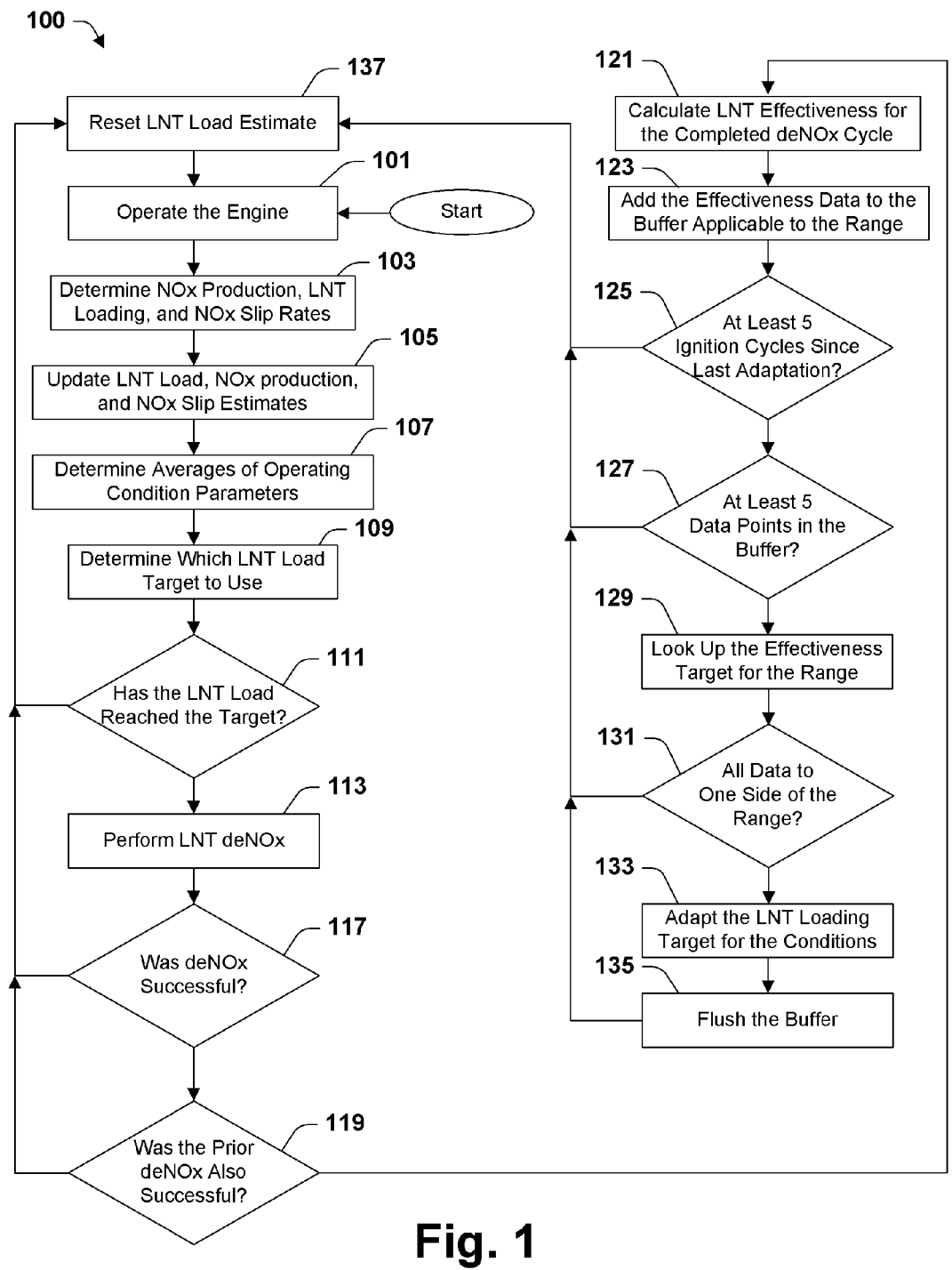
FIG. 1 is a flow chart of an exemplary method of the invention.

The invention encompasses methods of operation for the vehicle 200 schematically illustrated by FIG. 2. The invention extends to include systems that operate according to any of the inventive methods. The vehicle 200 comprises an engine 201, an exhaust aftertreatment system 202, and a controller 203. The exhaust aftertreatment system 202 comprises at least an LNT 204 and a $NO_X$ sensor 205. The controller 203 is configured and programmed to control the engine 201 and the exhaust aftertreatment system 202. Optionally, the controller 203 can be two or more separate units that collectively perform these functions.

The vehicle 200 operates though ignition cycles, $deNO_X$ cycles, and $deSO_X$ cycles. FIG. 3 illustrates these cycles through a finite state machine diagram 300. In the ignition off state 301, the engine 201 does not run. The vehicle 200 transitions from state 301 to the ignition on state 302 when an ignition switch is turned on. An ignition cycle is a division of the vehicle 200's operating time line demarcated to include one transition from the ignition off state 301 to the ignition on state 302 and one transition back to the ignition off state 301.

In state 302, the engine 201 is generally running and operates to produce a lean exhaust comprising $NO_X$. The exhaust is treated by the exhaust aftertreatment system 202. The exhaust contains $NO_X$, a portion of which is trapped by the LNT 204. From time-to-time, the controller 203 causes a transition from state 302 to state 304. In state 304, a $deNO_X$ operation that includes a rich phase is carried out to reduce the $NO_X$ loading of the LNT 204. The transitions to and from the state 304 demarcate $deNO_X$ cycles. The event that marks the end of one cycle and the beginning of the next can be selected arbitrarily provided the selection results in each $deNO_X$ cycle including exactly one transition from the normal operating state 302 to the $deNO_X$ operating state 304 and one transition in the reverse direction. Examples of suitable choices for the point of division include, without limitation, the transition to the $deNO_X$ operating state 304, the transition away from the $deNO_X$ operating state 304, the transition from lean operation to rich operation, and the transition from rich operation to lean operation. The latter is preferred. The running time of the engine 201 can be divided into a series of these $deNO_X$ cycles.

$DeSO_X$ cycles are defined in analogy to $deNO_X$. The exhaust from the engine 201 contains some $SO_X$ which also accumulates in the LNT 204. From time-to-time, the controller 203 forces a transition from the normal operating state 302 to the $deSO_X$ operating state 303, in which an operation is carried out to reduce the $SO_X$ accumulation. When a $deSO_X$ operation completes, the vehicle 200 transitions back to the normal operating state 302.

While the invention encompasses a method of operation for the vehicle 200, the invention relates in particular to a method of adapting one or more parameters relating to one or more of the timing or conduct of $deNO_X$ or $deSO_X$ operations beyond the immediate future. The preferred parameters are one that control the $deNO_X$ frequency. The adaptations are generally designed to compensate for aging. As the system ages, the LNT becomes less effective. Increasing the $deNO_X$ frequency compensates for aging by improving the average LNT effectiveness over each $deNO_X$ cycle. Likewise, the average LNT effectiveness can be improved by increasing the $deSO_X$ operation frequency. Increasing the duration or temperature of the $deSO_X$ operations also improves the average LNT effectiveness, although it should be appreciated that these modification generally increase the rate at which the LNT ages.

Adaptation comprises making changes to the numerical values of parameters that apply beyond the immediate future. The reference to "numerical values" is to distinguish changes to only logical (true or false) values. The reference to "beyond the immediate future" is to distinguish methods that change the scheduling or conduct of only the very next $deNO_X$ or $deSO_X$ operation.

Methods of the invention can be useful for distinguishing the long term effects caused by aging from transient phenomena. The invention encompasses methods of determining whether aging has occurred in the vehicle 200. It is useful to signal when the system has aged to the point of requiring service, regardless of whether any parameter adaptation is carried out.

Aging refers to irreversible or substantially irreversible changes in state that affect the aftertreatment system's effectiveness. Common causes of aging include without limitation engine wear, sintering of catalysts, and irreversible catalyst poisoning. Transient phenomena that can be confused with aging include without limitation variations in fuel, variations in the outside environment (temperature, pressure, and humidity), variation in sulfur loading of the LNT, and variations in the way a vehicle is driven.

Modifying the $deNO_X$ frequency, which is the preferred adaptation to aging, is adjusting one or more parameters in criteria used by the controller 203 to determine whether the time has arrived to initiate a $deNO_X$ operation 304 including a rich phase. In a preferred embodiment, the $deNO_X$ frequency is adapted by making adjustments to $NO_X$ loading thresholds. Raising a threshold decreases $deNO_X$ frequency and lowering a threshold increases $deNO_X$ frequency. The adjustments that affect denitration timing depend on the $deNO_X$ timing criteria in use. Examples of $deNO_X$ timing criteria include without limitation elapsed time since last $deNO_X$, distance travelled since last $deNO_X$, and total engine $NO_X$ production since last $deNO_X$. The $deNO_X$ frequency can be adjusted by setting whichever threshold is relevant to the $deNO_X$ timing criteria.

In the preferred embodiment, adaptations to the $deNO_X$ frequency are based on data that characterizes $NO_X$ treatment effectiveness over intervals corresponding to one $deNO_X$ cycle. Each interval is an entire $deNO_X$ cycle, or the greater part thereof. The intervals may be enlarged to correspond to two or a greater number of $deNO_X$ cycles, but the preference is for each $NO_X$ treatment effectiveness data point to characterize effectiveness of $NO_X$ reduction over one $deNO_X$ cycle. Each $NO_X$ treatment effectiveness data point is determined using readings from the sensor 205 taken at multiple times over an interval. A weighted combination of values is derived from the readings. The weighted combination may provide an average value over the interval. Preferably, the weighted combination provides an approximate integration, whereby each effectiveness data point is based on totals over the interval. Examples of totals include $NO_X$ emitted by the engine 201 over the interval, total $NO_X$ slipping past the sensor 205 over the interval, and total $NO_X$ removed from the exhaust upstream from the sensor 205 over the interval. Preferably, the measurements are sufficiently numerous and well distributed over the interval that the precision of the $NO_X$ treatment effectiveness data points cannot be significantly improved by increasing the measurement frequency. The data points used for the adaptation represent $NO_X$ treatment effectiveness measured over spans of time as opposed to effectiveness measured at select instants in time.

The data collection intervals are preferably ordinary $deNO_X$ cycles, but optionally the intervals are limited to $deNO_X$ cycles over which operation is modified to providing accurate effectiveness data. One type of modification is to prepare for the data collection interval by carrying out an enhanced deNOX operation that provide a fuller or more definite degree of regeneration. A deNOx operation can be enhanced by increasing the reductant dose, or the rich phase length. Examples of other modifications include without limitation engine control or transmission control to reduce perturbations over the course of the interval.

The preferred $NO_X$ treatment effectiveness metric is a $NO_X$ reduction efficiency. The preferred reduction efficiency is the fraction of $NO_X$ produced by the engine 201 that is reduced by the aftertreatment system, 202 or a portion thereof comprising the LNT 204 over the interval. A similar metric is the mean $NO_X$ reduction efficiency over some substantial portion of the interval. Different performance metrics, such as the catalytic activity of the LNT 204 for $NO_X$ trapping, can be used instead. Some such metrics are obtained by normalizing the $NO_X$ reduction efficiency to account for the expected effects of one or more of exhaust flow rate, LNT temperature, and sulfur loading on $NO_X$ reduction rates. Other possible effectiveness metrics include, without limitation, grams or moles $NO_X$ emitted per unit exhaust volume, per unit fuel consumed, per mile traveled, or per bhp-hr over the interval.

In the preferred embodiment, the data characterizing $NO_X$ treatment effectiveness and used for adaptation is screened. Screening is the process of ignoring or not collecting data corresponding to periods in which $NO_X$ treatment effectiveness. The purpose of screening is to select only the data that is most probative or least influenced by confounding factors. Confounding factors can be specific or non-specific. Specific confounding factors are specific events know to reduce the reliability of $deNO_X$ effectiveness data as an indicator of aging. For example, if the preceding $deNO_X$ operation did not complete successfully, the $deNO_X$ efficiency will be lower than normal and difficult to compare with data collected following successful $deNO_X$ operations. Preferably, $deNO_X$ data collected following unsuccessful $deNO_X$ operations is screened. In the preferred embodiment, only data following two consecutive successful $deNO_X$ receives consideration. $NO_X$ treatment effectiveness will increase between $deSO_X$ operations due to $SO_X$ accumulation. One way to address this issue is to screen out data collected beyond a limited period following a successful $deSO_X$ operation. $NO_X$ treatment effectiveness will be diminished if certain components are malfunctioning. Some of these malfunctions will be detected and reported to the vehicle's onboard diagnostic system. The data can be screened by consulting that system and eliminating data collected when certain flags are present. Non-specific screening is screening based on the data values. Examples of non-specific screening include, without limitation, ignoring measurements outside of pre-defined limits and ignoring measurements that are outliers in comparison with other data.

There are several ways of qualifying regenerations as successful. Examples of methods of qualifying regenerations as successful include, without limitation, determining whether an expected improvement in $deNO_X$ efficiency followed the $deNO_X$ operation, determining whether the $NO_X$ release spike observed during the regeneration was within a range of expectation, determining whether the reductant concentration profile over the course of the $deNO_X$ operation was within acceptable limits, and determining whether the fuel reformer temperature profile varied within acceptable limits over the course of the $deNO_X$ operation.

A $deNO_X$ operation is unsuccessful if the LNT loading level of the LNT immediately following the operation is abnormally high. If the exhaust aftertreatment system employs an ammonia SCR catalyst that uses ammonia produced during $deNO_X$ operations to reduce $NO_X$, than a $deNO_X$ operation is unsuccessful if its ammonia production is abnormally low. Various faults can cause these abnormalities. The possible faults varying according to the exhaust aftertreatment system in use. Possible faults can include, without limitation, partial clogging of an exhaust line fuel dosing nozzle, inadequate fuel reforming in the exhaust upstream from the LNT, and excessively large unaccounted variations in the exhaust flow rate or oxygen concentration during the $deNO_X$ operation. Methods of detecting faults generally do not detect all types of faults. Accordingly, it is preferable to test two or more criteria before qualifying a $deNO_X$ operation as successful.

A preferred criteria for qualifying a $deNO_X$ operation as successful is whether the resulting improvement in $NO_X$ reduction efficiency was within an range of expectation. Faults that affect $deNO_X$ effectiveness data generally cause $NO_X$ reduction efficiency to be lower than the efficiency following a normal $deNO_X$ operation. The $deNO_X$ efficiency is measured shortly after the $deNO_X$ operation and compared to a predetermined value. The value can be an absolute value or a value determined in relation to the $deNO_X$ efficiency or $NO_X$ loading level shortly before the $deNO_X$ operation. The predetermined value is preferably a function of the current operating state of the system, which is typically a vehicle. The operating state of the system can be defined in terms of various parameters as discussed below.

If the system includes a fuel reformer (503) for use in $deNO_X$ operations, the fuel reformer temperature profile over the $deNO_X$ operation can be used to qualify success. In preferred systems, a $deNO_X$ operation comprises a lean warm-up phase over which a fuel reformer (503) is heated to steam reforming temperatures using a pre-determined fuel dosing rate profile. There follows a rich phase over which another dosing rate profile generates fuel-air ratios above the stoichiometric point and the fuel reformer (503) generates syn gas through oxidation and steam reforming reaction. The rich exhaust containing syn gas reduces and releases $NO_X$ held within the LNT 204. The fuel reformer temperature profile during these processes can reveal certain faults. If the dosing rate profile over the lean warm-up phase is incorrectly set or executed, the reformer (503) may heat inadequately and not operate properly during the rich phase. The temperature profile will reveal whether the warm-up was effective. During the rich phase, the fuel reformer temperature will be dependent on the reactions it catalyzes. Fuel reforming reactions are complex, but their net effect can be reasonably approximated as a combination of complete combustion, steam reforming, and the water-gas shift reaction. Complete combustion is exothermic, steam reforming is endothermic, and the water-gas shift reaction is comparatively thermal-neutral. In a normal rich phase, the ratio between the effective rates of exothermal combustion and endothermic steam reforming results in a certain reformer temperature profile (temperature variation over time). In a fault condition, the catalyst does not perform well and reformate production is abnormally low. Typically, the fault condition has less of an effect on the exothermal combustion rate than on the endothermic steam reforming rate. As a result, faults of this type are often revealed by an abnormal rise in the temperature of the fuel reformer (503) during the rich phase.

If a sensor downstream from the LNT 204 provides fuel-air ratios, reductant concentration measurements can be used to qualify the success of $deNO_X$ operations. The fuel air-ratios can be used to measure the LNT's $O_2$ storage capacity or otherwise evaluate the adequacy of the reductant dose. Reductant dosing upstream from the LNT 204 is expected to provide a certain reductant concentration profile downstream from the LNT 204 over the course of the rich phase. If a sensor determines the actual reductant concentration in the exhaust was substantially different from the expected profile, a fault is indicated. In a preferred embodiment, the profile is analyzed to determine the peak reductant concentration over the deNO$_X$ operation. If the peak is less than a predetermined value, the operation is considered unsuccessful likely due to an inadequate reductant dose.

Another possible indicator of an unsuccessful deNO$_X$ operation is a greater than normal NO$_X$ release during the operation. If the reductant is diesel fuel that is injected into exhaust and reformed upstream from the LNT 204, a large NO$_X$ release may indicate that the injected fuel was reformed to a less than normal extent. Diesel fuel is less active for regeneration than reformate. If reforming does not occur to a normal degree, LNT regeneration may be incomplete and/or ammonia formation less than normal even if the fuel dose was correct. Examining the NO$_X$ release spike during deNO$_X$ operations generally detects these occurrences.

Before or after and regardless of whether the deNO$_X$ efficiency data is screened, the data is preferably sorted into bins according to the operating state of the vehicle 200. One purpose for sorting the data into bins is to limit comparisons of NO$_X$ treatment effectiveness data to comparisons among data collected under similar conditions. Where the parameters determining regeneration frequency varying according to operating conditions, another purpose of sorting is to adapt the parameters that apply to a given range of conditions only on the basis of data gathered over that same range. For example, in a preferred embodiment deNO$_X$ operation timing depends on an NO$_X$ loading of the LNT 204 meeting a threshold. A different threshold is set for each bin and the thresholds can be adapted independently. Optimal values for the threshold shift with aging to an extent that varies among the operating conditions. Adapting the thresholds based only on data gathered under the conditions to which the thresholds apply results in a more optimal set of parameters.

A bin is a category or classification for data. Each bin corresponds to a range of vehicle operating conditions. In mathematical terms, this is a range in a space of parameter values. The coordinates of the space are variables characterizing the operating state of the vehicle 200. Any suitable variable set can be used to define the operating state. Preferably, at least two variables are used. In one preferred embodiment, the variables are exhaust flow rate and LNT temperature. In another preferred embodiment, the engine torque and engine speed are the variables. Examples of other variables that might be employed include, without limitation, outside air temperature, degree of sulfur loading on the LNT, engine oil temperature, and the various possible combinations of the variables mentioned in this paragraph.

The operating parameters vary over the data interval. Preferably, average values over the intervals are used to classify the data points. If the operating conditions vary widely over the interval, the effectiveness may not be typical for the average conditions. Optionally, the NO$_X$ treatment effectiveness data can be screened to ignore data collected over intervals during which the operating conditions varied beyond a predetermined limit. The variation can be measured in any suitable manner. Exemplary measures include, without limitation, a standard deviation among measurements taken over the interval, a difference between minimum and maximum values, an average of the gradient in a parameter value, and a maximum gradient in the parameter. Optionally, the operating conditions at the end of the interval are used as a proxy for the condition prevalent over the interval. This latter choice is made more suitable if one of the foregoing limitations on variability is opted for.

The bins can form a grid in the space, with each coordinate corresponding to a range of values for an operating parameter. The space can also be divided into less regularly shaped bins. Preferably, at least 4 separate bins are used, more preferably at least nine separate bins, and most preferably at least 16 separate bins. If too few bins are used, the variability of conditions under which the data points within each bin are collected can make comparisons misleading and the effects of aging difficult to distinguish from other effects. If too many bins are used, it may take too long to collect sufficient data within any one bin to carrying out the desired adaptation.

Each bin can be a data buffer within the controller 203. FIG. 4 provides a schematic illustration of an exemplary data structure 400. Each bin can hold 3 or more entries, preferably from 5 to 15 entries. In the structure 400, there are n bins each of which can hold up to 5 entries. If a new data point becomes available for a bin that is full, the oldest data point in the bin is discarded to make room. In FIG. 4, an entry of 0 reflects the absence of a data point and a # sign reflects that data is present. Only bin 11 is full. The last entry in bin 11 is shown as an actual number rather than a # sign for purposes of illustration.

In the preferred embodiment, a bin must contain three or more data points before its data can be used for adaptation. Preferably, the data is screened to eliminate outliers prior to evaluation. For example, the highest and lowest data points may be discarded. In this case, at least five data points are required in each bin to allow three to remain for analysis after screening. Optionally, greater numbers of data points can be required in a bin prior to adaptation. Requiring at least three data points after optional screening of outliers allows the accuracy of the data to be improved through averaging and allows the data to be checked for internal consistency, which can be assessed in terms of either reproducibility or variability. Limiting the number of data points in a bin while discarding the oldest data keeps the data current. Optionally, data of greater than a certain age, which could be the preferred sampling period discussed below, is discarded.

Preferably, adaptation based on the data in a bin is not carried out unless the data meets a measure of internal consistency, which is optionally assessed following exclusion of outliers. One measure of internal consistency is a variance. A variance could be, for example the difference between the highest and lowest values or a standard deviation. For example adaptation may be predicated on the presence of at least five data points within a bin, and on the three middle values (that is, excluding the highest and lowest values) being within a 2% range. Examples of suitable limits for the variance are limits on the absolute spread or standard deviation of the data such as, 10%, 5%, 3%, and 2%. Another measure of internal consistency is whether all the data indicate the need for the same type of adaptation. For example, where the target for NO$_X$ removal effectiveness is given as a range, adaptation can be predicated on all the values in the bin being to one side (above or below) the range.

Frequent desulfation is synergistic with the present method in that it allows the variance limit to be kept low. Preferably, desulfation takes place before LNT efficiency drops by more than 5% since the last desulfation. Preferably the drop is kept within an even smaller limit, such as 4% or even 2%. Alternatively, the NO$_X$ treatment effectiveness data can be screened according to eliminate data collected when SO$_X$ accumulation has reduced LNT efficiency by these amounts.

Another preferred limit on adaptation requires a minimum period of data gathering. The period is measured from the last adaptation of the affected parameters or from the time at which the oldest data in a bin was collected. The data in a bin is generally emptied after an adaptation based on that data, making these requirements nearly equivalent. Preferably, the period is at least m ignition cycles, or m desulfation cycles.

Preferably, m is a number between 1 and 20, more preferably at least 2, and still more preferably at least 5. These period requirements can be effectively made without counting ignition or desulfation cycles, for example, by specifying a minimum number of operating hours, miles traveled, or fuel stops. Typical ignition cycles are from 1 to 10 hours. Desulfation cycles are generally of similar length or somewhat longer. The number of operating hours corresponding to m ignition cycles preferably falls in the range from about 10 to about 100 hours.

One purpose of the period requirement is to ensure that the data within a bin samples over the range of normal variations that affect $NO_X$ treatment effectiveness. Conditions such as oil temperature vary over an ignition cycle. Typically, a vehicle will refuel every few ignition cycles. Requiring several ignition cycles allow the data to reflect the effects of varying fuel composition. Preferably the data is spread over several desulfation cycles, with varying degrees of sulfur loading. The internal consistency requirement in combination with the period requirement avoids mistaking the effects of bad batch of fuel or an ineffective desulfation for those of aging.

When all the threshold tests have been met, adaptation can be made on the basis of the $NO_X$ treatment effectiveness data in the qualified bin. The adaptation involves a comparison between the $NO_X$ treatment effectiveness shown by the data and a predetermined $NO_X$ treatment effectiveness target or target range. The adaptations to the parameters can be made in predetermined increments or as a function of the data values, for example, in proportion to the average of the difference between the data values and the target value. These average can be weighted to give greater weight to data collected when $SO_X$ accumulation within the LNT is lower. The parameters can be adjusted in one direction only causing $deNO_X$ frequency to monotonically increase over time, or either increased or decreased according to whether the data is above or below the target. Any or all of the thresholds, increments, proportionality factors, and targets for effectiveness are optionally set dependently on the operating range in which the parameter being adapted applies.

In the preferred embodiment, the values of the accumulated data points are used to determine whether to perform the adaptation, but the magnitude of the adaptation is predetermined. The predetermined amounts are calibrated amounts and differ according to bin. Using predetermined increments prevents excessively large adaptations that could be the result of misleading data.

In the preferred embodiment there is a separate parameter, such as an LNT loading threshold, for each bin or range of operating conditions. Preferably, the adaptations are made selectively to the parameter applying under operating conditions correspond to the bin. This generally means only the parameter applying under the bin's operating conditions is adapted on the basis of data within the bin. However, the term selective adaptation encompasses the possibility that parameters corresponding to other bins are also adapted to some extent provided the adaptations are in diminishing amounts according to distance of the other bins from the bin containing the data on the basis of which the adaptation is made. For example, the adaptation is selective if parameters corresponding to bins adjacent the bin containing the data in the operating parameter space are adapted to some extent based on the data but the parameters corresponding to more distant bins not adapted at all.

In an alternative embodiment, prior to adapting the loading thresholds, adaptations to the $deNO_X$ operation itself are considered first. According to this method, when all the threshold tests for adaptation have been met, a diagnostic is scheduled. When the operating conditions correspond to the bin are next detected an enhanced $deNO_X$ operation is carried out and the $NO_X$ treatment effectiveness measured over the following interval. If the data point collected in this way does not show the same need for adaptation indicated by the prior data, the bin is flushed and the parameters of the $deNO_X$ operation applicable to the bin conditions are adapted. For example, the reductant dose can be incrementally raised.

The adaptations referred to here are adaptations that are made on the basis of the present method. These adaptations maintain exhaust treatment effectiveness and mainly compensate for aging. The present method is not inconsistent with the simultaneous use of other algorithms that adapt the $deNO_X$ frequency to account for other effects. For example, the thresholds could be further modified to account for ambient conditions, fuel properties, and especially degree of sulfur loading. These other adaptations are generally reversed upon the occurrence of a specific event, such as desulfation, refueling, a change in ambient conditions, and especially the end of an ignition cycle. For example, short term adaptations can be made using less stringent criteria, but maintained only in volatile memory that is flushed at the end of each ignition cycle. The adaptations according to the present method are carried over to the next ignition cycle by using the ECU's non-volatile RAM or flash memory.

Figure 5:
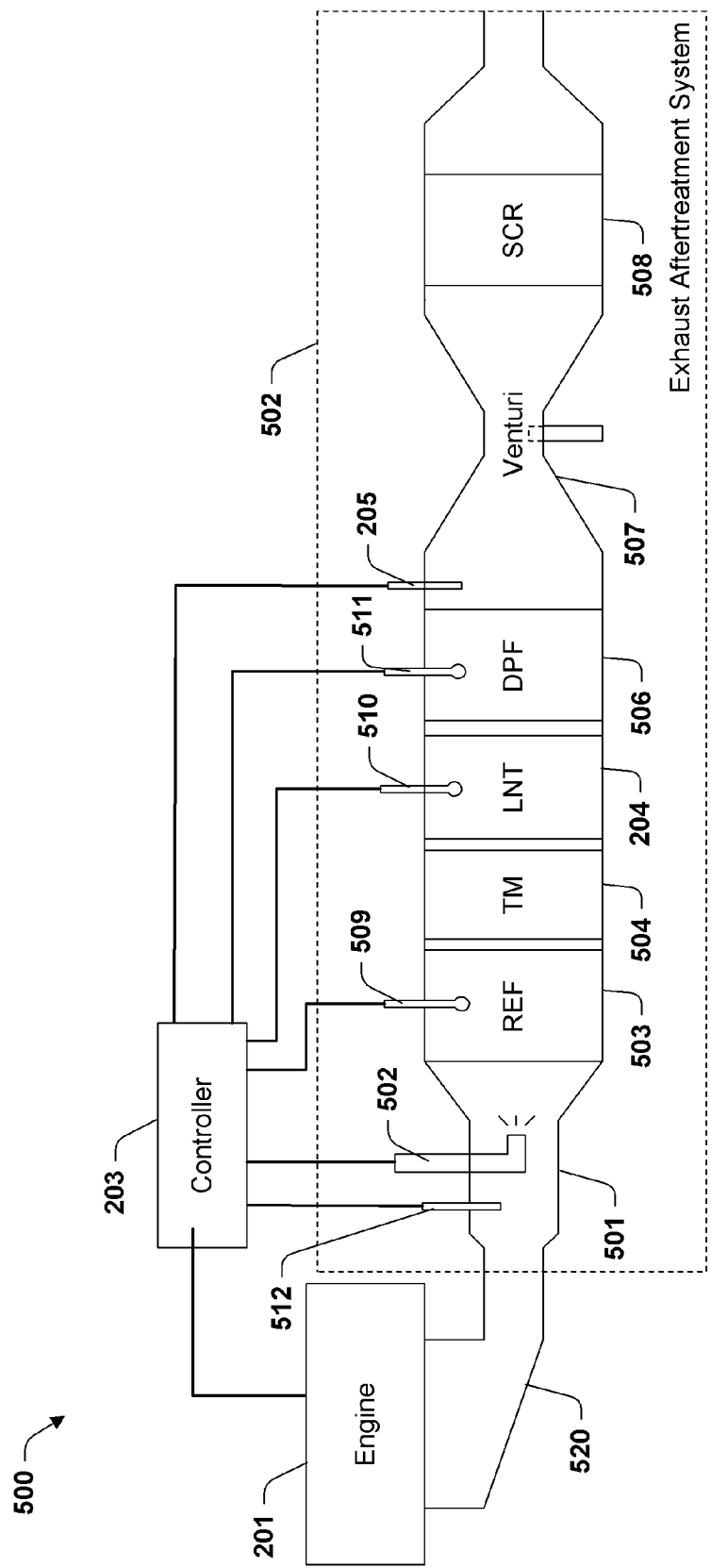
FIG. 5 is an schematic illustration of a preferred system in which the invention can be applied.

FIG. 5 is a schematic illustration of a vehicle 500 comprising the engine 201, a manifold 520, and a preferred exhaust aftertreatment system 502, which is an example within the generic aftertreatment system 202. The engine 201 operates to produce a lean exhaust comprising $NO_X$. The exhaust is conducted by the manifold 520 into the exhaust aftertreatment system 502. Preferably the exhaust aftertreatment system 502 comprises a single exhaust line 501 that receives the entire exhaust flow from the engine 201.

The exhaust aftertreatment system 502 comprises the exhaust line 501, which channels the exhaust from the manifold 520 through, in order, a fuel reformer 503, a thermal mass 504, an LNT 204, a DPF 506, a Venturi 507, and an SCR catalyst 508. A fuel injector 512 is configured to inject fuel into the exhaust line 501 upstream from the fuel reformer 503 at times and at rates determined by the controller 203.

The controller 203 may be a control unit for the engine 201 or a separate control unit. If separate, the controller 203 preferably communicates with the engine 201's control unit. Configuring the vehicle 500 to operate according to a method of the invention comprises programming the controller 203 to implement the method. With suitable programming and any other necessary adaptations, the system 500 will be functional to carry out the method.

The controller 203 receives data from various sensors, including the $NO_X$ concentration sensors 205 and 512 and the temperature sensors 509, 510, and 511, such as a temperature sensor 212. Preferably, the $NO_X$ concentration sensor 205 has dual functionality and can measure air-fuel ratios. Optionally, the sensor 205 can be located in a different position downstream from the LNT. Positioning the sensor 205 downstream from the SCR 508 has the advantage of providing $NO_X$ reduction effectiveness data for the system 202 as a whole as opposed to just a portion of that system comprising the LNT 204. A disadvantage of that position in the system 500 is that the dilution factor provided by the Venturi 507 must be measured or estimated in order to properly interpret the data.

The $NO_X$ concentration sensor 501 provides the concentration of $NO_X$ in the engine exhaust prior to treatment. The temperature sensor 509 is configured to sense a characteristic temperature for the reformer 503. The sensor 509 may be positioned inside the fuel reformer 503 or in the exhaust immediately downstream from the fuel reformer 503. Similar comments apply to the temperature sensor 510, which measures a characteristic temperature for the LNT 204 and the temperature sensor 511, which measures a characteristic temperature for the DPF 511.

The engine 201 can be any engine that operates to produce a lean exhaust stream comprising $NO_X$ and $SO_X$. Generally the engine 201 is a diesel-fueled compression ignition internal combustion engine that produces an exhaust containing from 2 to 20% oxygen. The diesel exhaust is typically at temperatures in the range from about 200 to about 500° C., with temperatures in the range from 250 to 450° C. beginning most common.

The exhaust aftertreatment system 502 and the exhaust line 501 preferably have no valves or dampers that control the flow of exhaust. Exhaust system valves and dampers provide control over the distribution of exhaust between a plurality of flow paths. Such control is desirable in terms of limiting fuel usage. Reducing the flow of exhaust to the fuel reformer 503 and the LNT 204 during $deNO_X$-and $deSO_X$-operations would reduce the amount of fuel expended eliminating oxygen from the exhaust in order to provide rich conditions. The reduced flow rate would also increase residence times, and thus the efficiency with which reductants are used. Nevertheless, it is preferred that the exhaust treatment system 502 operate without exhaust line valves or dampers in order to avoid failures resulting from reliance on such devices.

The LNT 204 is a device that adsorbs $NO_X$ under lean conditions and reduces $NO_X$ releasing the reduction products ($N_2$ and $NH_3$) under rich conditions. Some alternate terms for a lean $NO_X$ trap (LNT) are $NO_X$ absorber-catalyst and $NO_X$ trap-catalyst. An LNT generally comprises a $NO_X$ adsorbent and a precious metal catalyst in intimate contact on an inert support. Examples of $NO_X$ adsorbent materials include certain oxides, carbonates, and hydroxides of alkaline earth metals such as Mg, Ca, Sr, and Ba or alkali metals such as K or Cs. The adsorption can be physical or chemical, but is generally primarily chemical. The precious metal typically comprises one or more of Pt, Pd, and Rh. The support is typically a monolith, although other support structures can be used. The monolith support is typically ceramic, although other materials such as metal and SiC are also suitable for LNT supports. The LNT 204 may be provided as two or more separate bricks.

The fuel reformer 503 and the fuel injector 502 are part of a system for producing the rich conditions and providing the reductant required for $deNO_X$-and $deSO_X$-operations. A reductant is a compound that is reactive to accept oxygen and become oxidized. The reductant is generally diesel fuel or a substance derived from diesel fuel by partial combustion and or steam reforming reactions. A rich condition for the exhaust is one in which the concentration of reductants is more than stoichiometric for combustion with any oxygen and other oxidizing compounds present. In other words, a rich environment is one in which there is an excess of reductant and the overall composition is reducing rather than oxidizing.

Optionally, the engine 201 is used to assist in producing rich conditions. If the engine 201 can be operated with rich combustion or with post-combustion fuel injection, than the engine 201 can provide a rich mixture and the exhaust line fuel injector 502 is optional. The engine 201 can also facilitate generating rich conditions by measures that reduce the exhaust oxygen flow rate. Such measures may include, for example, throttling an air intake for the engine 201, increasing exhaust gas recirculation (EGR), modifying cylinder injection controls, and shifting gears to reduce the engine speed.

It is preferable for the aftertreatment system 502 to be capable of providing the rich conditions for $deNO_X$ and $deSO_X$ operations while making few or no changes to the operation of the engine 201 in order to avoid having regenerations ($deNO_X$-and $deSO_X$-operations) adversely affect drivability and also to provide greater independence between the designs and configurations of the aftertreatment system 502 and the engine 201.

The fuel reformer 503 is a device that is functional to reform diesel fuel into reformate, especially CO and $H_2$. Reformate is a better reductant than diesel fuel for reducing and releasing $NO_X$ from the LNT 204. Reformate is more reactive than diesel fuel and results in less $NO_X$ slip. $NO_X$ slip is the release of unreduced $NO_X$ from the LNT 204 during $deNO_X$-operations.

Preferably, the fuel reformer 503 has a low thermal mass and comprises both oxidation and steam reforming catalysts. A low thermal mass allows the fuel reformer 503 to be heated to steam reforming temperatures for each $deNO_X$ operation without requiring an excessive amount of time or fuel. Steam reforming temperatures have a minimum in the range from about 500 to about 600° C., typically requiring at least 550° C. At steam reforming temperatures, energy from oxidation and partial oxidation, which are exothermic, can drive steam reforming, which is endothermic. This improves the efficiency with which reformate is produced and decreases the amount of waste heat. A sufficiently low thermal mass can be achieved by constructing the fuel reformer 503 around a monolith substrate formed of thin metal foils, e.g., 130 microns or less. Preferably the foils are 100 microns or less, more preferably 50 microns or less. The preferred structure can be heated from a typical diesel exhaust temperature in the range from 250 to 300° C. to steam reforming temperatures in 2 or 3 seconds or less.

The exhaust from the engine 201 generally comprises at least 2% oxygen. When fuel is added to the exhaust to produce a rich condition for a $deNO_X$ or $deSO_X$, this oxygen is eliminated by combustion. In the system 502, this combustion takes place in the fuel reformer 503. If the combustion does not take place upstream from the LNT 204, it will generally take place within the LNT 204. The precious metal catalysts typically used by the LNT 204 are functional as oxidation catalysts. If too much combustion takes place within the LNT 204, it can cause undesirable temperature excursions, which are particularly problematic if they take place during $deNO_X$ operations. Such temperature excursions can cause wear and result in the release of unreduced $NO_X$.

Optionally, a burner or any device that is functional to bring about combustion, such as an oxidation catalyst, a three-way catalyst, or a suitably catalyzed diesel particulate filter can be used in place of the fuel reformer 503. Like the fuel reformer 503, these devices can cause combustion to take place upstream from the LNT 204. They may also accomplish a certain amount of fuel reformate through partial oxidation reactions.

When combustion takes place upstream from the LNT 204 in preparation for or during a $deNO_X$ operation, the heat is preferably held temporarily within devices upstream from the LNT 204 to be released only slowly over a prolonged period. According to the preferred design, the fuel reformer 503 has a low thermal mass (thermal inertia) and is not very effective for holding heat. In the system 502, the thermal mass 504 provides the desired heat retention function.

The thermal mass 504 is any device that is effective for exchanging heat with the exhaust and storing the heat produced by the fuel reformer 503 over the course of a deNO$_X$ operation without heating excessively. A suitable device can be simply a catalyst substrate, with or without a catalyst. A suitable device is, for example, an inert monolith substrate, either metal or ceramic. Preferably, the thermal mass 504 has a thermal inertia that is greater than that of the fuel reformer 503. The DPF 506 can be used as the thermal mass 504, although in the exemplary system 502, the DPF 506 is downstream from the LNT 204 and helps protect the SCR catalyst 508 from high temperatures during desulfations.

The DPF 506 and the SCR catalyst 508 contribute to meeting emission control limits and durability requirements. The DPF 506 removes particulate matter from the exhaust, which is the major pollutant in diesel exhaust other than NO$_X$. The SCR catalyst 508 provides supplementary NO$_X$ mitigation. It improves durability by allowing sufficient NO$_X$ mitigation to be maintained with less frequent regeneration of the LNT 204. When some NO$_X$ is reduced downstream from the LNT 204, the LNT 204 does not need to be maintained at as high a level of efficiency.

A DPF is a device that traps particulate matter (soot), removing it from the exhaust flow. The DPF 506 can be a wall flow filter, which uses primarily cake filtration, or a flow-through filter, which uses primarily deep-bed filtration. The DPF 506 can have any suitable structure. Examples of suitable structures include monoliths. A monolith wall flow filter is typically made from a ceramic such as cordierite or SiC, with alternating passages blocked at each end to force the flow through the walls. A flow-through filter can be made from metal foil.

Trapped soot can be removed from the DPF 506 continuously by catalyzing reactions between soot and NO$_X$, but typically the DPF 506 must be heated from time-to-time to a temperature at which it regenerates by combustion of trapped soot. The temperature required for soot combustion can be reduced by a catalyst. Suitable catalysts include precious metals and oxides of Ce, Zr, La, Y, and Nd. Soot combustion is exothermic and can be self-sustaining once ignited.

The SCR catalyst 508 is an ammonia-SCR catalyst functional to catalyze reactions between NO$_X$ and NH$_3$ to reduce NO$_X$ to N$_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, exchanged with metal ions such as cations of Cu, Co, Ag, Zn, or Pt.

The SCR catalyst 508 performs better under lean conditions. The Venturi 507 draws ambient air into the exhaust line 501 upstream from the SCR catalyst 508 to maintain lean conditions even during rich phase tgar regenerate the LNT 204. The Venturi 507 also helps protects the SCR catalyst 508 from high temperatures.

The engine 201 operates to produce a lean exhaust comprising NO$_X$, particulate matter, and SO$_X$. The expression NO$_X$ designates the family of molecules consisting of nitrogen and oxygen atoms, primarily NO and NO$_2$. The subscript X indicates the family includes multiple species with varying proportions between nitrogen and oxygen atoms. The notation SO$_X$ is similar.

Under lean conditions, the LNT 204 adsorbs a portion of the NO$_X$ and a portion of the SO$_X$ in the exhaust. If the SCR catalyst 508 contains stored ammonia, an additional portion of the NO$_X$ is reduced therein. The DPF 506 removes at least a portion of the particular matter from the exhaust.

From time-to-time, the controller 203 determines to perform a deNO$_X$ operation on the LNT 204. This operation begins with a lean warm-up phase in which the fuel reformer 503 is heated to steam reforming temperatures by injecting fuel into the exhaust line 204 through the fuel injector 502 under the control of the controller 203. The warm-up phase leaves the exhaust lean, under which condition most of the injected fuel combusts in the fuel reformer 503, generating heat. After the warm-up phase is complete, the fuel injection rate is controlled to make the exhaust condition rich for a period of time (rich phase) over which the LNT 204 is regenerated.

During the rich phase, injected fuel mixed with the exhaust enters the fuel reformer 503. A portion of the fuel combusts, consuming most of the oxygen from the exhaust. Another portion of the fuel is converted to reformate (syn gas), which is primarily H$_2$ and CO. The reformate enters the LNT 204 where it reacts to reduce and release trapped NO$_X$. Most of the NO$_X$ released during the rich phase is reduced to N$_2$ or NH$_3$, although it is typical for a small amount to be released (slip) without being reduced. The NH$_3$ is mostly trapped by the SCR 508, where it is generally consumed reducing NO$_X$ over the course of the following lean phase.

NO$_X$ slip occurs primarily at the beginning of the rich phase and may be lessened by varying the reductant concentration over the course of the rich phase. The preferred reductant concentration profile has the reductant concentration relatively low at the start of the rich phase and gradually increasing over at least a first portion of the rich phase.

When the fuel reformer 503 heats for denitration, the thermal mass 504 also heats, but to a lesser degree. After denitration is complete, fuel injection ceases and the fuel reformer 503 cools to exhaust temperatures. The thermal mass 504 also cools. The LNT 204 will heat over the course of the deNO$_X$ operation and a short period following, but only to a modest degree.

From time-to-time, the LNT 204 must be heated substantially in order to carry out a deSO$_X$ operation. In the system 502, the LNT 204 can be heated by injecting fuel into the exhaust. The injected fuel combusts, primarily in the fuel reformer 503. Over the course of a few minutes, the thermal inertias of the thermal mass 504 and of the LNT 204 are overcome and the LNT 204 reaches desulfating temperatures. Alternative and supplemental means of heating the LNT 204 include, without limitation, engine measures, such as operating the engine to produce a hot exhaust, burners, and electrical heaters.

In the system 502, after the LNT 204 has reached desulfating temperatures, the fuel injection rate is controlled to make the exhaust rich. It might be considered ideal to maintain the rich condition until the LNT 204 has desulfated to a desired degree. In the system 502, however, it proves difficult to continuously maintain rich conditions while also maintaining the fuel reformer 503 and the LNT 204 within desired temperature ranges. In general, it is necessary to pulse the fuel injection over the course of a desulfation in order to create alternating rich and lean phases (periods). During the rich phases, the reformer 503 heats and produces reformate. During the lean phases, fuel injection ceases and the fuel reformer 503 cools. Typically, the durations of the rich phases are in the range from about 4 to about 30 seconds. While the fuel reformer 503 is allowed to cool somewhat during the lean phases, it is kept sufficiently hot to catalyze steam reforming until the deSO$_X$ operation is completed.

It is generally also necessary to regenerate the DPF 506 from time-to-time. Regenerating the DPF 506 comprises heating the DPF 506 to temperatures at which soot trapped within the DPF 506 combusts. The DPF 506 can be heated in the same way as the LNT 204 is heated for desulfation. Once the DPF 506 is heated to soot combustion temperatures, the energy released by combusting soot facilitates maintaining the soot combustion temperatures.

The DPF 506 is typically of the wall flow filter variety and must be regenerated often enough to avoid excessive back pressure. Ideally, regenerating the DPF 506 each time the LNT 204 undergoes $deSO_X$ provides sufficient frequency. The DPF 506 is heated to soot combustion temperatures each time the LNT 204 is heated for a $deSO_X$ operation. If the DPF 506 has sufficient capacity to require regeneration no more often than the LNT 204 undergoes $deSO_X$, supplemental fuel expenditure and additional heating of the LNT 204 for the sole purpose of regenerating the DPF 506 can be avoided.

One approach that can facilitate not having to regenerate the DPF 506 more often than the LNT 204 is desulfated is to provide a second DPF downstream from the fuel reformer 503 and upstream from the LNT 204. This second DPF can be used as the thermal mass 504, but is preferably a low thermal mass device upstream from the thermal mass 208. Preferably, this second DPF is of the flow-through type. Preferably, its thermal mass is sufficiently low that it heats and regenerates each time the fuel reformer 503 is heated for a $deNO_X$ operation. Accordingly, in this embodiment, there is a second DPF that regenerates as often as the LNT 204 undergoes $deNO_X$.

The timing with which the LNT 204 undergoes $deNO_X$ is determined by the controller 203. Typically, certain prerequisites must be met before allowing a $deNO_X$ operation to begin. Prerequisites can be, for example, one or both the LNT 204 and the fuel reformer 503 being at minimum temperatures, the oxygen concentration being below a maximum (e.g., less than 19%), the flow rate being above a minimum (e.g., significantly greater than at idle), the engine speed variance, as determined by a moving average, being below a maximum, a minimum time having elapsed since the last $deNO_X$ operation, and a gear shift not currently being imminent or in progress. If the prerequisites criteria are met, a $deNO_X$ operation will begin if the criteria controlling $deNO_X$ timing are met. These criteria generally relate to the urgency with which $deNO_X$ is required balanced against the suitability of current conditions for carrying out the operation.

The urgency of the need to perform $deNO_X$ is generally expressed in terms of the $NO_X$ loading of the LNT 204. Other measures of the urgency, many of which can be related to the $NO_X$ loading include, without limitation, remaining $NO_X$ storage capacity, $NO_X$ trapping efficiency (optionally normalized for such factors as the LNT temperature and exhaust flow rate), $NO_X$ concentration in the exhaust at a point downstream from the LNT 204, and cumulative $NO_X$ emissions since the last denitration (optionally normalized by the engine's toque production). A measure of suitability can relate to one or more of such factors as the exhaust oxygen concentration (low is preferred), the engine speed variance (low is preferred), and the exhaust flow rate.

Likewise, the timing $deSO_X$ operations is determined by the controller 210 in a suitable manner. Threshold criteria may be employed similar to those used for $deNO_X$. The threshold can be set to balance the suitability of current conditions to desulfation against a measure of the urgency of the need for desulfation. The urgency of the need to desulfated can be based on, for example, one or more of an estimate of the amount sulfur trapped in the LNT 204, the frequency with which $deNO_X$ operations are being required, an estimate of the post-$deNO_X$ efficiency or storage capacity of the LNT 204, the amount of time since the last $deSO_X$ operation, the number of $deNO_X$ operations since the last $deSO_X$. The LNT efficiency or storage capacity can be normalized to separate changes intrinsic to the LNT 204 from changes in the operating regime of the engine 201. The threshold can be variably set based on prevailing conditions in order to tolerate less sulfur when peak LNT efficiency is required, e.g., when the engine 201 is in a high speed-high load condition.

FIG. 1 is a flow chart of a preferred vehicle operating method 100. This method can be implemented by the controller 203. Step 101 is normal engine operation to produce lean exhaust comprising $NO_X$. Step 103 is determining the rates of $NO_X$ production, $NO_X$ slip, and LNT loading. The rate of $NO_X$ production can be estimated from the engine operating point. Alternatively, the $NO_X$ concentration in the exhaust upstream from the LNT 204 can be measured using a sensor 512. The measured concentration is multiplied by the exhaust flow rate to obtain the $NO_X$ production rate. The exhaust flow rate can be determined in any suitable fashion, such as direct measurement or estimation from the engine 201's operating point.

The rate of $NO_X$ slip is determined from the $NO_X$ concentration measured by the sensor 205 multiplied by the exhaust flow rate. The $NO_X$ loading rate is the difference between the $NO_X$ slip production rate and the $NO_X$ slip rate. If the sensor 205 is placed downstream from a device such as the SCR 508, the $NO_X$ loading rate differs from the net of the $NO_X$ production rate and the $NO_X$ slip rate by the amount of $NO_X$ reduced within the SCR 508. This difference can be ignored without consequence. In this situation, the LNT loading thresholds are compared to the apparent loading indicated by the sensor readings.

Step 105 is an integration step. The rate of LNT loading is multiplied by a measurement interval and added to a running sum. The total production and slip rate are also integrated. While only one integration is required to track the LNT loading, at least one additional integration is required to separately calculate the $NO_X$ treatment effectiveness. A person adept in mathematics will recognize some redundancy in the calculations of steps 103 and 105. These steps should be understood as being any one of the various forms of calculation that result in the same information.

Step 107 is determining the average exhaust flow rate and average LNT temperature for the current $deNO_X$ cycle. These averages provide a characterization of the prevailing operating conditions for the current $deNO_X$ cycle. Taking averages is only one possible way of characterizing the prevailing operating conditions. Not only are other characterizations possible, but different characterizations may be used to for different purposes. For example, the characterization in terms of average values may be used to sort the $NO_X$ removal effectiveness data while a characterization in terms of the most recently measured values is used to select which LNT loading target to use. In the method 100, the same characterization is used for both purposes.

Step 109 is determining the LNT loading target. This is a table lookup based on the prevailing conditions determined by step 107. Each table position contains a distinct LNT loading target and corresponds to a distinct range of operating conditions. The table rows correspond to different ranges for one operating condition parameter and the table columns corresponding to different ranges for another operating condition parameter. Each table position is a bin or category of operating conditions.

Step 111 compares the applicable LNT loading target as determined by step 109 to the LNT loading estimate determined by step 105 to decide whether the time has arrived to proceed to a $deNO_X$ operation, step 113. Until such time arrives, steps 101-111 are repeated.

During the $deNO_X$ operation 113, the measurements and calculations of steps 103 through 107 continue to update the averages and integrals used to characterize the prevailing conditions for the current deNO$_X$ cycle and to determine the NO$_X$ treatment effectiveness for the entire cycle. Completion of the deNO$_X$ operation 113 marks the end of the current deNO$_X$ cycle and the beginning of the next. The averages and integrals will be reset in step 137 as a new cycle begins.

After performing the deNO$_X$ operation in step 113, the method 100 proceeds to step 117, which checks various criteria to determine whether the just completed deNO$_X$ cycle was successful. Multiple criteria, such as the temperature of the fuel reformer 503 and the LNT efficiency following the deNO$_X$ operation are examined. The deNO$_X$ is deemed a success only if all the criteria are satisfied.

There is some inconsistency between the linear sequence of events illustrated by the flow chart of FIG. 5 and the necessary order of events. For example, the improvement in LNT efficiency used to qualify the success of the deNO$_X$ operation in step 117 cannot be accomplished until the next deNO$_X$ cycle has begun. In this regard, it should be understood that FIG. 5 illustrates the steps of the method 100 and their logic, but that certain steps can be performed simultaneously or in a different order from that of the illustration.

If step 117 deems the deNO$_X$ operation to have been successful, step 119 checks whether the preceding deNO$_X$ operation was also deemed successful. If so, the method proceeds to calculate the NO$_X$ treatment effectiveness over the just-completed deNO$_X$ cycle in step 121. The effectiveness is based on the integrals provided in step 105 and through step 113. The result is a data point that is placed in a bin or buffer in step 123. The bin or buffer to use is determined from the average operating conditions for the just completed deNO$_X$ cycle.

The method 100 then checks in step 125 the length of time since the last update of the LNT loading threshold in the bin just used. If the period spans at least 5 ignition cycles, the number of data points in the bin is checked with step 127. If the number is at least 5 (greater than 4), the consistency of the data is checked in step 129.

Step 129 determines whether all the data, exclusive of the highest and lowest values in the bin, is within the same range. There are three possible ranges. One is a target range, which is predetermined for the bin. A second is values below the target range and a third is values above the target range. If all of the data is in the same range either above or below the target range, the method 100 proceeds to step 133 in which an adaptation is performed. Otherwise, no adaptation takes place prior to beginning the next deNO$_X$ cycle with step 137.

The adaptation carried out in step 133 is to change the NO$_X$ loading target for the operating condition range corresponding to the bin. The target is either raised or lowered according to whether the treatment effectiveness was above or below the target range. After the update has taken place, the bin is flushed of data in step 135.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operation for a vehicle comprising an engine and an exhaust aftertreatment system, comprising:
    operating the engine through a series of ignition cycles to produce exhaust;
    treating the exhaust with a lean NOx trap (LNT) within the exhaust aftertreatment system;
    operating the exhaust aftertreatment system in deNOx cycles each comprising a lean phase in which NOx accumulates within the LNT and a deNOx operation comprising a rich phase in which accumulated NOx is reduced and released;
    operating the exhaust aftertreatment system in deSOx cycles each comprising a plurality of deNOx cycles over which SOx accumulates within the LNT and a deSOx operation in which accumulated SOx is reduced or released;
    measuring NOx concentration in the exhaust at a position downstream from the LNT over intervals corresponding to at least one entire deNOx cycle, or the greater part thereof;
    using the measurements to determine NOx treatment effectiveness data in which each data point characterizes NOx treatment effectiveness for a distinct interval and is determined from a plurality of the measurements made over the interval;
    sorting the data into categories according to operating conditions under which the data was collected, each category corresponding to a distinct range of operating conditions, there being at least four different categories;
    analyzing the NOx treatment effectiveness data on a category-by-category basis, the analysis comprising comparing the data to a target value or value range applicable to data in that category;
    adapting the numerical values of one or more parameters on the basis of the comparison, the parameters relating to one or more of the timing or conduct of deNOx or deSOx operations beyond the immediate future;
    accumulating the sorted data; and
    wherein the adaptations are contingent on a category having at least a minimum number of data points that have accumulated over at least a minimum period, the minimum number being at least three and the minimum period spanning at least one ignition cycle or one deSOx cycle.

2. The method of claim 1, wherein:
    the deNOX operations are begun when the LNT reaches an applicable NO$_X$ loading threshold;
    the adapted parameters comprise the loading thresholds; and
    there is a separate loading threshold for each of the distinct operating condition ranges.

3. The method of claim 2, wherein:
    there are a plurality of NO$_X$ treatment effectiveness targets;
    the applicable target depends on the operating condition range; and
    the effectiveness targets remain fixed while the LNT loading thresholds are adapted.

4. The method of claim 3, wherein the NO$_X$ treatment effectiveness data measures the fraction of NO$_X$ removed from the exhaust over the interval by the exhaust aftertreatment system or a portion thereof comprising the LNT.

5. The method of claim 1, wherein the minimum period spans at least two deSOx cycles or at least two ignition cycles.

6. The method of claim 1, wherein there is a target value range for each category and the adaptations are further contingent on the category having at least three data points to one side of the range.

7. The method of claim 1, wherein the adaptations are further contingent on the category having at least three data points having a variability within a pre-determined limit.

8. The method of claim 1, wherein the values of the accumulated data points are used to determine whether to perform the adaptations, but magnitudes of the adaptations are predetermined.

9. The method of claim 1, further comprising flushing the data within at least the category following adaptation based on the data accumulated within that category.

10. The method of claim 1, further comprising at least one filtering step that excludes some data either from being collected, being accumulated, or being considered in the analysis.

11. The method of claim 10, wherein the filtering comprises determining whether $deNO_X$ operations are successful and excludes data corresponding to intervals immediately following $deNO_X$ operations not deemed successful.

12. The method of claim 11, wherein determining whether a $deNO_X$ operation was effective comprises evaluating an extent to which the $deNO_X$ operation improved an $NO_X$ removal efficiency.

13. The method of claim 11, wherein determining whether a $deNO_X$ operation was effective comprises evaluating $NO_X$ concentration data pertaining to the release of unreduced $NO_X$ from the LNT during the $deNO_X$ operation.

14. The method of claim 11, wherein the $deNO_X$ operation comprises heating a fuel reformer and using syn gas produced by the heated fuel reformer to regenerate the LNT in the rich phase and determining whether a $deNO_X$ operation was effective comprises evaluating reformer temperature data collected during the $deNO_X$ operation.

15. The method of claim 10, wherein the filtering comprises determining whether $deNO_X$ operations are successful and excluding data unless the two immediately preceding $deNO_X$ operations were deemed successful.

16. The method of claim 1, wherein the $NO_X$ treatment effectiveness data measures the efficiency of $NO_X$ removal from the exhaust by the exhaust aftertreatment system or a portion thereof comprising the LNT.

17. The method of claim 1, wherein each $NO_X$ treatment effectiveness data point is based on either values summed over the interval of values averaged over the interval.

18. The method of claim 1, wherein there is a separate parameter for each category and the adaptations are weighted according to the closeness of the operating condition range of the adapted parameter's category to the operating condition range of the category containing the data on the basis of which the adaptations are made.

19. The method of claim 1, wherein there is a separate parameter for each of the operating condition ranges and each is adapted exclusively on the basis of data obtained within that operating condition range.

20. The method of claim 1, wherein the operating conditions under which a data point is gathered are determined by averaging the conditions over the corresponding interval.

21. The method of claim 1, wherein the operating conditions that define the categories map to the engine's torque and speed over the interval and/or the exhaust flow rate and LNT temperature over the interval.

22. The method of claim 1, wherein each interval corresponds to one distinct $deNO_X$ cycle.

23. A vehicle comprising one or more controllers programmed to collectively implement the method of claim 1.

* * * * *

UNITED STATES PATENT AND TRADEMARK OFFICE
CERTIFICATE OF CORRECTION

PATENT NO. : 8,701,390 B2  
APPLICATION NO. : 12/953325  
DATED : April 22, 2014  
INVENTOR(S) : Hanlong Yang et al.

Page 1 of 1

It is certified that error appears in the above-identified patent and that said Letters Patent is hereby corrected as shown below:

On the Title Page

The order of the inventors should be as follows

Item (12) on page 1 of US8701390 B2

"Chimner et al" should be "Yang et al"

also Item (75) on page 1 of US8701390 B2

Hanlong Yang, Christian Thomas Chimner

Signed and Sealed this  
Twenty-third Day of September, 2014

Michelle K. Lee  
*Deputy Director of the United States Patent and Trademark Office*